Nov. 7, 1967   W. F. CREIGH   3,351,514
FILM SPLICING CONSTRUCTION
Filed May 20, 1965
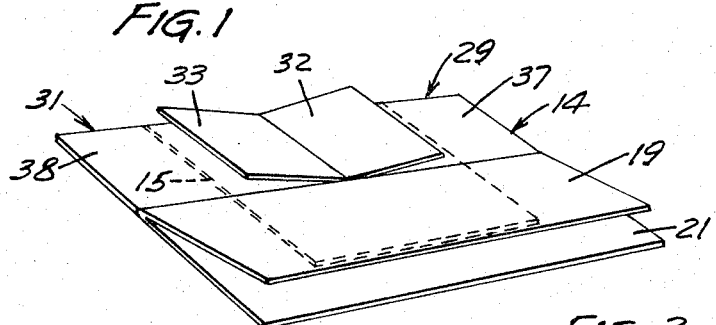
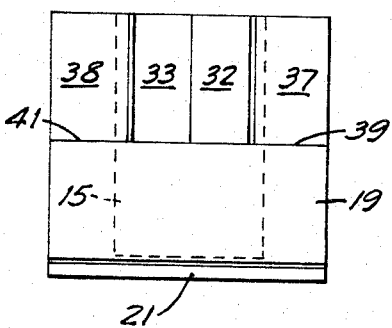
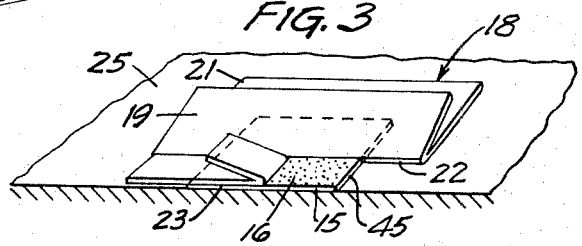
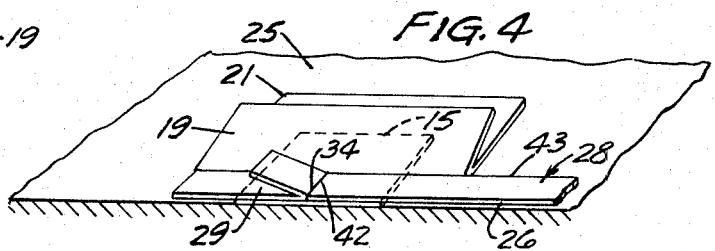
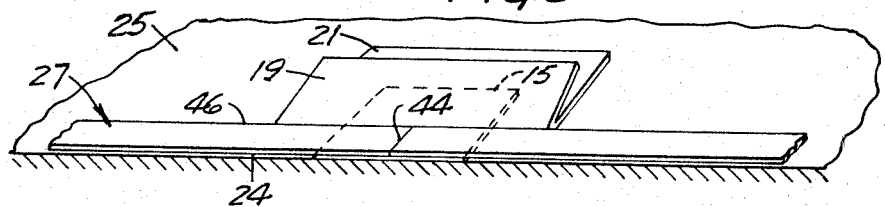
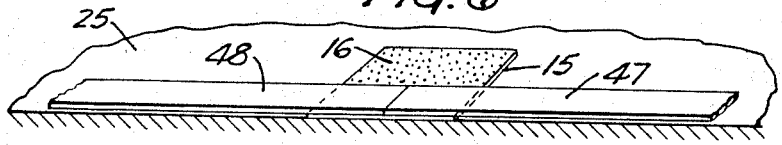
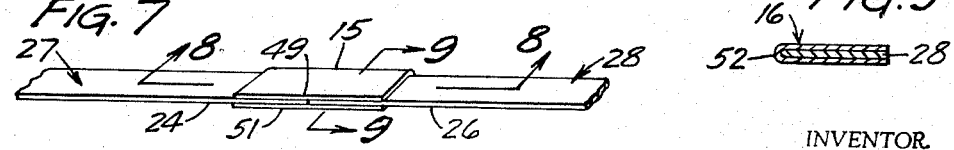
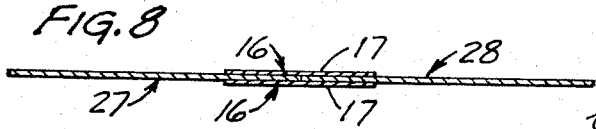
INVENTOR.
WALTER F. CREIGH
BY
Carpenter, Kinney & Coulter
ATTORNEYS United States Patent Office 3,351,514
Patented Nov. 7, 1967

3,351,514
FILM SPLICING CONSTRUCTION
Walter F. Creigh, Newport Township, Washington County, Minn., assignor to Minnesota Mining and Manufacturing Company, St. Paul, Minn., a corporation of Delaware
Filed May 20, 1965, Ser. No. 457,428
3 Claims. (Cl. 161—39)

This invention relates to film splicing constructions, and more particularly to such a construction which uses four elements, one element of which is a transparent pressure-sensitive sheet, such construction being especially adapted for use in splicing together in abutting relationship a pair of opposed ends of motion picture film.

An object of the present invention is to provide means for rapidly securing together the respective ends of two strips of film in aligned and connected relationship, said means being especially useful for use with unperforated film of the type commonly used in microfilming.

Another object of this invention is to provide a film splicing construction which employs not two pressure-sensitive sheet members as an essential part of its construction, but only a single pressure-sensitive sheet member.

Another object of this invention is to provide a film splicing construction which is adapted for use in a film splicing operation without the aid of auxiliary splicing apparatus and to provide film splices wherein a pair of abutting film are precisely aligned with one another.

Another object of this invention is to provide as an integral part of a splicing tab construction a template for exactly aligning opposed ends of film strips to be spliced together in a butt splice so as to produce a spliced film in which the opposite edges of the film form a continuous straight edge across the region of the splice.

Another object of this invention is to provide an improved apparatus and method for splicing film strips in opposed abutting relationship which permits application of a pressure-sensitive sheet member to both sides of such film strips being spliced without having to turn the strips over and using a separate splicing operation for each side of the opposed pair of strips.

Another object of this invention is to provide an improved apparatus and method for rapidly aligning and splicing together the opposed ends of a pair of film strips in a butt splice.

Other and further objects of this invention will become apparent to those skilled in the art from a reading of the attached specification taken together with the drawings wherein:

FIGURE 1 is a perspective view of one embodiment of a splicing tab construction of this invention;

FIGURE 2 is a top plan view of the embodiment shown in FIGURE 1;

FIGURE 3 is a perspective view of the embodiment of FIGURE 1 about to be used in a splicing operation with a lever removed and a portion of the pressure-sensitive sheet exposed;

FIGURE 4 is a view showing the end of one of a pair of film strips to be spliced duly mounted on the pressure sensitive sheet;

FIGURE 5 is a view showing a second liner removed and the end of the other of said pair of film strips to be spliced duly mounted on the pressure sensitive sheet;

FIGURE 6 is a view similar to FIGURE 5 but with the third liner removed;

FIGURE 7 is a view showing the pressure-sensitive sheet folded over upon the opposed faces of the abutting pair of film strip ends thereby completing a splicing operation;

FIGURE 8 is a vertical sectional view taken along the line 8—8 of FIGURE 7; and

FIGURE 9 is a vertical sectional view taken along the line 9—9 of FIGURE 7.

It will be appreciated that the words "film splicing construction" or equivalent as used in this application have reference to various types of film and tape constructions including motion picture film, aseptic tapes, surgical tapes, magnetic tapes and the like.

Turning to the drawings there is seen in FIGURE 1 a preferred embodiment of a splicing tab construction of my invention herein designated in its entirety by the numeral 14. The construction utilizes a generally rectangular transparent backing sheet 15 which can be of organic polymer material such as cellophane, polyvinylidene chloride, polyethylene terephthalate or the like, as those skilled in the art will readily appreciate.

One face of sheet 15, herein termed the face side 16 as opposed to a back side 17 of sheet 15 is coated with a layer of pressure-sensitive adhesive material, which, owing to thinness of the layer and the limitations of the attached drawings is not shown as a separate and distinct layer in the backing sheet 15.

Superimposed upon about one half of the face side 16 is a first liner sheet herein designated in its entirety by the numeral 18. Liner sheets, as those skilled in the art will appreciate, are constructed of such materials as paper, plastic or the like which can be coated or treated at least on one face thereof so as to be releasable from a pressure-sensitive adhesive without destruction of either the pressure-sensitive adhesive or the liner facing in contact with such adhesive. Suitable coatings for liner sheets include silicones and various polymeric materials such as poly tetrafluoro ethylene, etc. The first liner sheet 18 has a first tab portion 19 which is joined to a first base portion 21 at a first fold line 22. It is the base portion 21 of the liner sheet 18 which contacts the face side 16 of backing sheet 15. A liner sheet 18 acts as an alignment means for aligning opposed abutting film strips to be spliced together.

The manner in which the liner sheet 18 is superimposed upon the face side 16 is relatively unimportant except that the first fold line 22 should be so positioned as to extend across the mid region of the backing sheet 16. It is preferred, however, to have the first fold line 22 extend across the middle of the backing sheet 15 in generally spaced parallel relationship to opposed side edges thereof so that the back sheet 15 will have a forward edge 23 which is generally flush with the side edges 24 and 26 of, respectively, a pair of film strips 27 and 28, as will be appreciated from the drawings and present specification hereinafter.

The splicing construction 14 also includes a pair of second liner sheets 29 and 31. Each such second liner sheet 29 and 31 has a second tab portion, 32 and 33, respectively, joined to a second base portion 37 and 38, respectively, at a second fold line, each being designated by the respective numerals 34 and 36.

These second liner sheets 29 and 31 have their respective base portions 37 and 38 superimposed upon the remainder of the face side 16 of sheet 15; that is, the second base portions 37 and 38 cover the exposed portion of the face side 16 which is not covered by the first liner sheet 18. The second liner sheets 29 and 31 are so positioned on the face side 16 that the respective second fold lines 34 and 36 abut against one another along their lengths. Observe that the respective fold lines 34 and 36 are each so formed in second liner sheets 29 and 31 as to be substantially normal to the edge 39 and 41, respectively, of second liner sheets 29 and 31 which lies adjacent to the first fold line 22 in the splicing construction 14.

While the position of the pair of second liner sheets 29 and 31 relative to the face side 16 is not critical, it is preferred to have the respective second fold lines 34 and 36 abut against one another at a mid portion of the sheet 15 on face side 16 thereof. Thus, in the preferred embodiment shown, such abutment occurs midway between the side edges 42 and 43 of sheet 15 and the second fold lines 34 and 36 are each perpendicular to the first fold line 22.

The second liner sheets 29 and 31 can be constructed of the same or different material from that used in forming the first liner sheets 18. For ease in use it is sometimes convenient to form the second liner sheets 29 and 31 of material having a different color from that used in forming the first liner sheet 18. While as shown in the embodiment depicted in the drawings, the liner sheets 18, 29 and 31 can underly the various edge portion of sheet 15. The liners 18, 29 and 31 can be so proportioned as to be generally coextensive with the face side 16 of the backing sheet 15. However, in general, it is desirable not to have the backing sheets 18, 29 and 31 formed or impressed over the face side 16 of sheet 15 so as to leave portions of the face side 16 showing because then dust and debris can collect upon the pressure-sensitive adhesive and impair the efficacy of the adhesive and the transparency of the sheet.

The manner in which the splicing construction 14 is used is understood by reference to FIGURES 3 through 9 which sequentially illustrate the steps involved in forming a film splice using the splicing construction 14. Thus, in FIGURE 3 is illustrated the first step in a splicing operation. The splicing construction 14 is conveniently laid upon a flat surface 25. The second liner sheet 31 is removed thereby exposing a portion of the face 16 of sheet 15. Next, as shown in FIGURE 4 a film strip 28 having a forward end portion 42 previously cropped so as to be at right angles to side edge 26 and opposed side edge 43 thereof is laid upon, the exposed portion of face side 16 (caused by the removal of the second liner sheet 31). During such laying-up operation the forward end 42 is made to butt up against the second fold line 34 of second liner sheet 29 while the side edge 43 of film strip 28 is caused to abut against the first fold line 22 of first liner sheet 18. Observe how both the first fold line 22 and the second fold line 34 are used in positioning the film strip 28 upon the sheet 15.

In the next operation, illustrated in FIGURE 6, the remaining second liner sheet 29 is removed (conveniently using its second tab 32) and the film strip 27 is laid upon the face 16 and is exposed by the removal of the second liner sheet 29. As in the case of film strip 28, the forward end 44 of the film strip 27 is previously cropped so as to be substantially normal to the side edge 24 and side edge 46 of film strip 27. The film strip 27 is then so laid upon the face 16 as to have its forward end 44 butt against the forward end 42 of film strip 28, and so as to have its side edge portion 46 butt against the first fold line 22. As a result, the film strip 28 is now in aligned and connected relationship with the film strip 27 in a butt splice wherein the opposite edges, that is, edges 26 and 24 on the one side and edges 43 and 46 on the other side, each form a continuous straight edge across the region of the splice.

The next operation is illustrated in FIGURE 7 where the first liner sheet 18 has been removed thereby leaving the remainder of face 16 of sheet 15 exposed. This exposed portion is then conveniently folded over upon faces 47 and 48, respectively, of film strips 28 and 27 so as to form a completed splice construction as shown in FIGURE 7. Observe that the width of the pair second liner sheets 29 and 31, in the embodiment shown, has been chosen so as to reach the width of the film strips 27 and 28, and further note that the width of the portion of backing sheet 15 covered by first liner sheet 18 is such that when such portion is folded over as shown in FIGURE 7, the edge 49 of sheet 15 is generally flush with the edges 24 and 26 of film strips 27 and 28, respectively.

The relationship between the sheet 15 and the film strips 27 and 28 in the completed splice is shown in the sectional views of FIGURES 8 and 9. It will be appreciated that the relationship is such that if there is any overlap of edge 49 or edge 51 of sheet 15 in the completed splice construction that simple cropping can be employed to make the edges exactly aligned and that a simple cropping, cutting or like operation can be used to eliminate the fold 52 in sheet 15 in the conformed splice. Naturally, those skilled in the art will appreciate that preferred film splicing construction within the teachings of this invention are those which are so dimensioned as to not require any subsequent cropping or like operations in a film splicing operation of the type depicted in the figures.

It will further be appreciated that if it is desirable to form a splice which is unusually thin a modification of the foregoing method of using the film splicing construction 14 can be used instead of removing the first liner sheet 18 and then folding over sheet 15 as described, the first liner sheet 18 and the associated portion of sheet 15 can be cropped away after the step illustrated in FIGURE 6 has been completed.

Although the foregoing description has been made by reference to a single embodiment of the present invention it will be appreciated that equivalent constructions and other methods of splicing can be used without departing from the spirit and scope of the present invention.

The claims are:
1. A film splicing construction comprising
    (a) a generally rectangular, transparent backing sheet having a face side and an opposed back side, said face side being coated with a pressure-sensitive adhesive,
    (b) a first liner sheet having a first tab portion joined to a first base portion at a first fold line, said first base portion being superimposed upon a portion of said face side, and
    (c) a pair of second liner sheets each having a second tab portion joined to a second base portion at a second fold line, said second base portions both being superimposed upon the remaining portions of said face side, said pair of second liner sheets being so positioned on said face side as to abut against one another along their respective second fold lines.

2. A film splicing construction comprising
    (a) a generally rectangular, transparent backing sheet having a face side and an opposed back side, said face side being coated with a pressure-sensitive adhesive,
    (b) a first liner sheet having a first tab portion joined to a first base portion at a first fold line, said first base portion being superimposed upon about one half of said face side, said first fold line being positioned across the mid region of said backing sheet, and
    (c) a pair of second liner sheets each having a second tab portion joined to a second base portion at a second fold line, said second base portions both being superimposed upon the remainder of said face side, said pair of second liner sheets being so positioned on said face side as to abut against one another along their respective second fold lines.

3. A film splicing construction comprising
    (a) a generally rectangular, transparent backing sheet having a face side and an opposed back side, said face side being coated with a pressure-sensitive adhesive,
    (b) a first liner sheet having a first tab portion joined to a first base portion at a first fold line, said first base portion being superimposed upon about one half of said face side, said first straight fold line being positioned across the mid region of said backing sheet, and (c) a pair of second liner sheets each having a second tab portion joined to a second base portion at a second fold line, said second base portions both being superimposed upon the remainder of said face side, said pair of second liner sheets being so positioned on said face side as to abut against one another along their respective second fold lines.

References Cited

UNITED STATES PATENTS

| | | | |
|---|---|---|---|
| 2,969,106 | 1/1961 | Reibel et al. | 156—157 |
| 2,994,362 | 8/1961 | Hall | 156—505 |
| 3,043,188 | 7/1962 | Baia | 156—157 |
| 3,136,679 | 6/1964 | Bender | 156—505 |

EARL M. BERGERT, *Primary Examiner.*

D. J. DRUMMOND, *Assistant Examiner.*